US008230390B2

(12) United States Patent
Koster (10) Patent No.: US 8,230,390 B2
(45) Date of Patent: Jul. 24, 2012

(54) TEMPLATE-BASED RULE GENERATION

(75) Inventor: Klaus Koster, Duisburg (DE)

(73) Assignee: Nokia Corporation, Espoo (FI)

( * ) Notice: Subject to any disclaimer, the term of this patent is extended or adjusted under 35 U.S.C. 154(b) by 1518 days.

(21) Appl. No.: 11/727,774

(22) Filed: Mar. 28, 2007

(65) Prior Publication Data

US 2008/0196002 A1 Aug. 14, 2008

Related U.S. Application Data

(60) Provisional application No. 60/900,321, filed on Feb. 9, 2007.

(51) Int. Cl.
*G06F 9/44* (2006.01)

(52) U.S. Cl. ........ 717/109; 717/106; 717/110; 717/111; 717/113

(58) Field of Classification Search .................. None
See application file for complete search history.

(56) References Cited

U.S. PATENT DOCUMENTS

| | | | | |
|---|---|---|---|---|
| 5,917,489 | A | 6/1999 | Thurlow et al. | 345/347 |
| 6,349,306 | B1 | 2/2002 | Malik et al. | |
| 6,963,815 | B2 * | 11/2005 | Watanabe et al. | 702/123 |
| 7,631,296 | B2 * | 12/2009 | Seshadri et al. | 717/117 |
| 2001/0052910 | A1 * | 12/2001 | Parekh et al. | 345/744 |
| 2002/0032688 | A1 | 3/2002 | Serrano-Morales et al. | |
| 2003/0110192 | A1 | 6/2003 | Valente et al. | |
| 2003/0172367 | A1 * | 9/2003 | Kannenberg | 717/101 |
| 2003/0217333 | A1 * | 11/2003 | Smith et al. | 715/513 |
| 2003/0221184 | A1 * | 11/2003 | Gunjal et al. | 717/118 |
| 2004/0088196 | A1 * | 5/2004 | Childress et al. | 705/4 |
| 2005/0049815 | A1 * | 3/2005 | Watanabe et al. | 702/123 |
| 2005/0246686 | A1 * | 11/2005 | Seshadri et al. | 717/117 |
| 2005/0257267 | A1 | 11/2005 | Williams et al. | |
| 2006/0080599 | A1 * | 4/2006 | Dubinsky | 715/513 |
| 2006/0161881 | A1 * | 7/2006 | Saad et al. | 717/104 |
| 2007/0043980 | A1 * | 2/2007 | Ohashi et al. | 714/45 |
| 2007/0250460 | A1 * | 10/2007 | Armstrong et al. | 706/11 |
| 2009/0183097 | A1 * | 7/2009 | Bayiates | 715/764 |
| 2010/0122235 | A1 * | 5/2010 | Betawar et al. | 717/106 |

FOREIGN PATENT DOCUMENTS

WO  WO 2005/001662 A2  1/2005

OTHER PUBLICATIONS

Software AG, "The Graphical Rule Editor", Crossvision Product Documentation, accessible on Feb. 6, 2007on web page "http://documentation.softwareag.com/crossvision/xei/ostudio/ostudiorulesedi-tor.htm".

A. Rigallo et al., "Real-Time Monitoring and Operational Assistant System for Mobile Networks", IEEE Network Operations and Management Symposium (NOMS) 2002; Apr. 2002; Florence, Italy.

(Continued)

*Primary Examiner* — Insun Kang
(74) *Attorney, Agent, or Firm* — Harrington & Smith (57) ABSTRACT

A rule-based monitoring framework offering a simplified GUI-driven and template-based way to specify and generate monitoring rules. The automatically generated rules can be directly deployed or further modified, in particular by combining plural templates. The modification can take place in two different views on the rule: the code view and the template view. The views can be changed at any time during the modification/generation process. Test data and rule documentation for the generated rule may be automatically generated from the GUI-driven input data.

32 Claims, 6 Drawing Sheets

OTHER PUBLICATIONS

Alessandro Rogallo, et al.; "Real-Time Monitoring and Operational Assistant System for Mobile Networks"; 2002; pp. 1-3.
Helman T. et al.; "Application Generator Based on Parameterized Templates"; 2004; pp. 151-157.
CrossVision; "The Graphical Rule Editor"; Sep. 25, 2006; pp. 1&2.
International Search Report, PCT/EP2008/050829, filed Jan. 24, 2008.
Visual Paradigm; "Visual Paradigm for UML, IDE Integration User's Guide"; XP002479840; 2006; pp. 1-25.
ILOG; "Business Rules Development Tools White Paper"; XP002479841; 2003; pp. 1-31.
Thongmak, et al.; "Design of Rules for Transforming UML Sequence Diagrams into Java code"; 2002; pp. 1-10.

* cited by examiner

TEMPLATE-BASED RULE GENERATION

CROSS REFERENCE TO RELATED APPLICATIONS

This application claims priority of U.S. provisional patent application Ser. No. 60/900,321, filed on Feb. 9, 2007. The subject matter of that provisional application is hereby incorporated by reference.

BACKGROUND OF THE INVENTION

1. Field of the Invention

The present invention relates to template-based rule generation. In particular, embodiments of the present invention relate to a framework for template-based rule generation for a rule-based system, such as a rule-based monitoring system.

2. Description of the Related Art

Generally, rule-based systems refer to any kind of system which is configured to process (i.e. handle) their tasks on the basis of specified rules. In this regard, rules designate directives for processing, which may be pre-defined by an operator of the respective rule-based system. Such rule-based systems may be applied to any kind of task or purpose, and they are thus not restricted to any specific kind of application.

For the purpose of illustrating the present invention and its embodiments, network monitoring systems are taken as a non-restrictive example for rule-based systems. Nevertheless, it will be evident that the present invention and its embodiments as set out in the following will be applicable to any kind of rule-based system, such as for example service monitoring systems.

Rule-based network monitoring systems normally process alarms and network performance measurements to conclude on the state of services in communication or information technology (data) networks. The conclusion whether a network service is up or down, or if the service quality is sufficient, is done by so-called monitoring rules consisting of conditions and actions. The rules are checked in terms of their specific conditions on the incoming alarms and measurements, and then executed with the corresponding actions accordingly.

When setting up a network monitoring tool for monitoring services in a network, the administrator has to define the rules according to which problematic situations shall be detected and/or handled in the specific network. This usually involves the definition of error conditions (e.g. an alarm XYZ has been received, a network performance measurement has exceeded a threshold, etc.) and the corresponding actions (e.g. indicate the problem in the monitoring tool, launch a repair script etc.).

In a monitoring system, the typical life-cycle of a monitoring rule starts with the specification, the implementation and testing, and the deployment phases. Depending on the flexibility of the monitoring system the rule implementation can be performed in various ways ranging from simple form-based user interfaces (e.g. definition of simple conditions with thresholds and selection from a limited number of actions) up to flexible, but more complex scripting solutions.

It is to be noted that what is called "rule development" in this specification may also be called "learning phase", "system fine-tuning", "system setup phase" or "system configuration" in the context of the different network monitoring tools or other conceivable applications.

Existing network monitoring systems offer the ability to process events or messages (e.g. alarms, network performance measurements) sent by data collectors or agents from some part of the network. The way monitoring rules may be defined depends on the complexity of the required or desired rule. For less complex rules, there are a number of known GUI-driven (GUI: graphical user interface) approaches, while the implementation of complex rule logic requires the knowledge of a programming language, and is a rather cumbersome procedure to be carried out by skilled personnel.

In the following, there is described in more detail what is meant by complex and less complex rules and their typical development phases including testing and documentation.

The least complex and most common form of monitoring rules may be considered to be filtering rules applied on individual events. Important events are identified by threshold or comparison conditions applied on individual fields of the event. The implementation of these types of rules may be supported by form-based user interfaces and does usually not require the knowledge of a programming language. Upon creation, the rules are usually tested by inspecting the result of events sent by simulators with the corresponding event field content. The rules are documented, if necessary, in the network operator's own way and format. That is, the rule creator such as the network operator manually generates test data or manually configures test simulators, and manually creates documentation of the created rule by way of natural language or the like.

An example of such a simple rule generation approach by means of a graphical user interface is for example described in Crossvision Product Documentation "The Graphical Rule Editor" by Software AG, which was accessible on Feb. 6, 2007 in the documentation section of the Software AG web site under the "webMethods" heading. The described rule editor is for rapid and cost-efficient creation, management and governance of new business processes. The graphical user interface for entering rules may be switched between three different views with different representations of the edited rule, i.e. diagram view, stylized English view and Flogic paraphrase view.

The implementation of a rule becomes more complex if the rule logic processes information contained in different events (e.g. event correlation). The splitting up of information over multiple events is necessary when the information is generated by different sources or at different moments in time. Furthermore, the requirement of Boolean logic between different conditions contributes to an increased rule complexity. This is for example the case in modern IT/IP (data) and communication networks consisting of a variety of different network elements from different vendors having different configurations, or providing a variety of different services of different categories and/or levels. Such a variety creates a situation where the same network requirement can be implemented in various ways. For a (network or service) monitoring tool this means that the monitoring rules need to be adaptable to the specific network conditions and/or services provided. A standard monitoring solution that would be locally developed by monitoring tool experts and then reapplied to all network elements is likely to fail or become extremely complicated in the majority of such cases.

The implementation of such complex rules in complex environments requires a high degree of flexibility that is hard to achieve with standard form-based user interfaces. Therefore, complex logic is often implemented by means of a programming language, e.g. as external scripts. For example, form-based interfaces for specifying threshold-based rules may be supplemented by external modules in programming languages such as Perl or C in order to implement more complex rule logic.

In this scenario, the rule development involves the typical steps and skills known from software development ignoring the fact that personnel that specify the rules are usually network administrators and not software developers. This problem has sought to be overcome by using skilled network administrators having software development background, or by the administrator writing a specification that is implemented by a separate software development teams (e.g. consultants or third party integration teams). Both approaches raise the costs of implementing a rule significantly as compared to the simple case where an administrator without programming skills can implement the rule. Furthermore, the risk of error increases with different people being involved in one rule implementation process.

Such a more advanced approach for rule generation is for example known from "Real-Time Monitoring and Operational Assistant System for Mobile Networks" by A. Rigallo, F. Verroca and A. L. String a, IEEE Network Operations and Management Symposium (NOMS) 2002, April 2002, Florence, Italy. This article is focused on network monitoring by means of a tool called "NetDoctor" based on JRules, which is a general framework for building rule engines by ILOG. That is, the described approach is directed to rule engine building on a general level without going into detail as regards how rules are generated. JRules is based on the RETE algorithm and allows defining rules with conditions and actions. The rules can be defined in a technical language, which is close to Java syntax. A less technical view to the rules may be provided by the so-called Business Action Language, where the rule has a textual representation. The tool focuses on the implementation of the business logic and does not provide an implementation of the rule actions, but leaves this to the business objects (implemented as Java objects). Also, this tool does not address the problems associated with generation of test data and documentation.

Another approach for rule generation is known from U.S. Pat. No. 5,917,489 which is directed to creating, editing and distributing rules for processing electronic messages. In the context of this patent, electronic messages include e-mail, meeting requests and task requests. Accordingly, the thus described approach is directed to hyperlink-based message processing (e.g. mail filtering in Microsoft® Outlook) rather than to more complex environments such as network or service monitoring. The document U.S. Pat. No. 5,917,489 describes a GUI-based rule wizard allowing the user to generate rules for message processing. The rule generation process is either done by a step-by-step guidance through various windows displaying options and/or variables for rule generation, or template-based by selecting one template as basis for the rule generation. The template used is either pre-defined or can be added by a system administrator. As the template is used as provided (without the ability to modify it as necessary), the described approach lacks flexibility in rule generation, thus only allowing generation of rather simple or precast rules.

Another drawback of the described approach resides in that the template used has options that depend on each other, which means that, if one option is selected, a number of other options can be selected. Therefore, there is required a GUI supporting dependant options, i.e. multiple successive windows with next/back buttons. Also, by way of this approach, rules are executed in a specific order. Thus, it is possible that a later rule in a rule list is never executed because an earlier rule prevents its execution, e.g. the e-mail to reach the latter (first-rule-wins strategy).

Another problem with known approaches for rule generation, including those mentioned above, relates to generation of test data and documentation, as already indicated above.

The more complex a rule becomes the more complex is also the testing of the rule. Test data needs to be generated that simulates all possible states of the rule's conditions and verifies the corresponding rule actions. However, there is no known available solution for this problem other than the manual creation of such test data, which is both cumbersome and error-prone.

The need for a clear rule documentation becomes more important with growing rule complexity and with the size of the network and its monitoring team or the variety of services provided in a network. If the rule is implemented using internal features of the monitoring tool, then the tool's own GUI can be used to explore and understand the rule logic. External rule implementations have limited support and require their own documentation, which is why internal solutions are preferable.

There are available a number of techniques for rule documentation and specification, for example textual descriptions, decision tables, or flow charts. The textual description, that describes a rule in an "if then" sentence is preferable because of its simplicity. However, there is no known solution for reliable rule documentation apart from the manual documentation by the rule creator.

However, information about the rule logic is contained not only in the implementation, but (if developed, i.e. manually by the rule creator) also in the test code and the rule documentation. Therefore, changing the logic requires changing all three development items individually (and manually), which is a further drawback of known approaches.

In view of the above, it is evident that known approaches for rule generation for rule-based (monitoring) systems exhibit several drawbacks in view of implementing complex (monitoring) rules in an easy and flexible way, preferably in a graphical manner, as well as generating rule code, test data, and rule documentation.

Thus, a solution to the above problems and drawbacks is needed for providing a rule generation for rule-based (network or service monitoring) systems in a complex environment.

SUMMARY OF THE INVENTION

Hence, it is an object of the present invention, for example, that it may remove at least some of the above problems and to provide an improved solution for rule generation.

According to embodiments of the present invention, this object is, for example, achieved by a method, a device, a module, and/or a computer-readable medium for selecting at least two pre-defined rule templates, combining the selected rule templates into one rule, and generating a rule code of the rule.

The above-mentioned method, device, module, and/or computer-readable medium according to aspects of the present invention may be configured for a template-based rule code generation in a rule-based monitoring system and/or for a template-based rule code modification in a rule-based monitoring system.

Further advantageous developments, aspects, features, and advantages of the present invention and its embodiments will become evident from the subsequent description of preferred embodiments in conjunction with the accompanying drawings.

In short, by virtue of the present invention and its embodiments, there is provided an easy and flexible way to specify, implement, test and document rules in rule-based (monitoring) systems, for example for monitoring networks or services in a communication environment.

Among others, the present invention and its embodiments provide at least one of a combined usage of multiple templates when generating a new rule, or when modifying a pre-existing rule, and an automatic test data generation and/or automatic documentation for the new rule being generated or the pre-existing rule being modified.

By virtue of the present invention and its embodiments, a network administrator, who has the knowledge of the network or the services to be monitored and what needs to be monitored, is able to generate or modify even complex monitoring rules himself/herself. Thus, it is practicable that he/she complies with his/her task to setup or modify the rules for monitoring the network even without having a software programming background. Such a rule development process thus provides at least some of the following features.

The process is simple to understand, but its simplicity does not limit the possible complexity of the rule to be generated or modified. Rules such as monitoring rules may thus be specified in a human-readable way without the knowledge of a tool-specific language, which is particularly preferable for network administrators.

The development process may hide the monitoring tool specific knowledge (e.g. a programming language or the monitoring tool architecture), and may limit the administrator's input to a minimum to achieve a fast implementation process.

For fast changing network technologies, there is provided an adaptable and extendable way to define rules with new conditions and actions or adapt existing rules to them.

For rule testing, the required test data may be part of the rule generation/modification process: information that is provided for the rule information may be automatically reused for generating the test data.

For documentation purposes, the rule specification may be convertible into human-readable text that can be understood with general knowledge about the monitoring domain, but without expert knowledge on the monitoring tool. The documentation may be part of the rule generation process: information that is provided for the rule information may be automatically reused for generating the rule documentation.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The present invention is described herein with reference to particular non-limiting examples. A person skilled in the art will appreciate that the invention is not limited to these examples, and may be more broadly applied.

In particular, the present invention is mainly described within the field of network operation support systems (network management), and especially the area of network monitoring. Thus, the description mainly refers to a rule-based network monitoring system. As such, the description of the present invention and its embodiments given herein specifically refers to terminology which is directly related to such a network monitoring system. Such terminology is only used in the context of the presented examples, and does not limit the invention in any way. Rather, the present invention and its embodiments are applicable to any kind of rule-based system, in particular to any kind of rule-based monitoring system including network monitoring, service monitoring and the like. Moreover, the present invention and its embodiments are generally applicable to any environment where code needs to be produced, which controls a limited number of objects and actions being applicable to them.

Although the subsequent description mainly refers to rule generation, it is to be noted that rule generation herein also covers rule modification, i.e. the generation of a new rule and the modification of a pre-existing rule may be regarded as equivalent operations (wherein the rule modification may additionally comprise at least one of adding a template, removing a pre-existing template, and modifying parameters of one or more pre-existing templates).

In general, embodiments of the present invention refer to a framework (hereinafter also referred to as rule editor) that allows graphical creation of (network) monitoring rules of all complexities being textually describable, e.g. in communication and IP (Internet Protocol) and IT (Information Technology) networks.

The rule creation or generation is based on a GUI-driven user control on the basis of pre-defined templates. The graphical rule description is converted into executable source code. At the same time, the input information may also be used for generating test data (to verify the generated rules) and a rule documentation.

Figure 1:
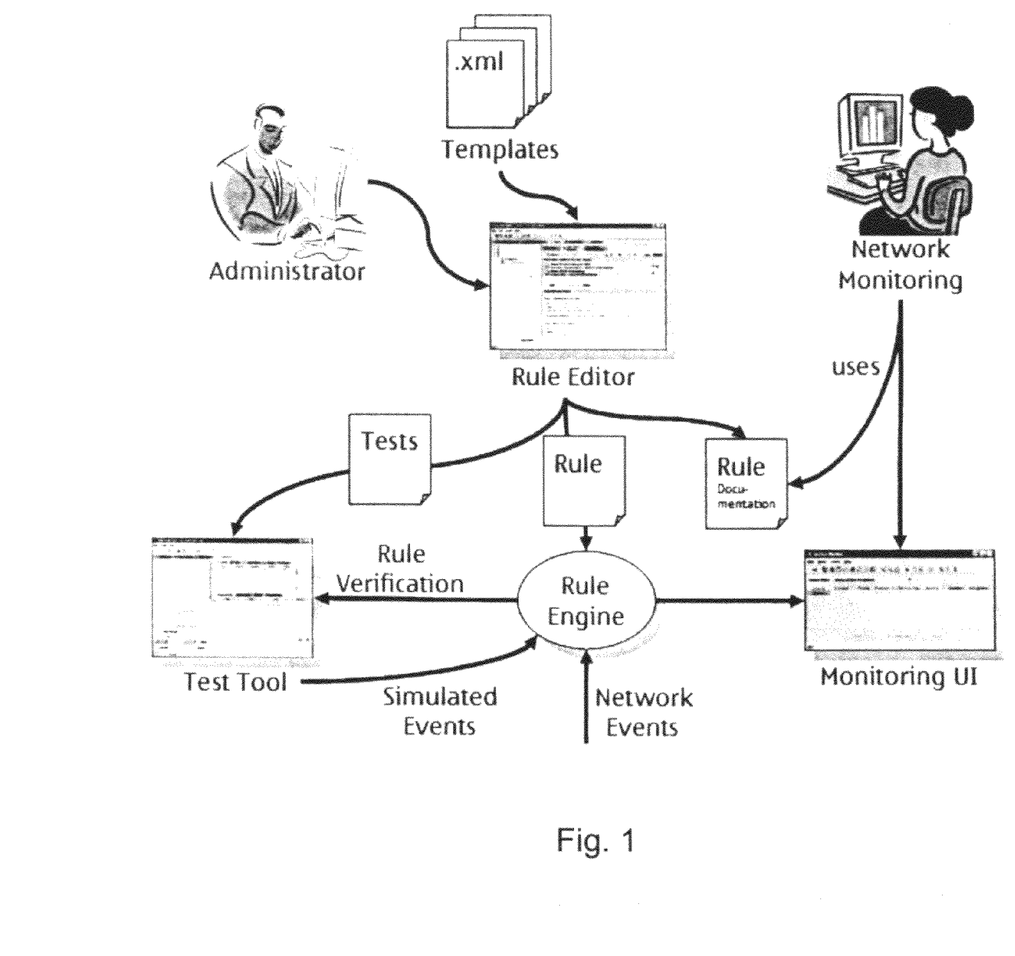
FIG. 1 illustrates a basic overview of a system arrangement according to an exemplary embodiment of the present invention.

FIG. 1 illustrates a basic overview of a system arrangement according to an embodiment of the present invention. In the system arrangement of FIG. 1, there are shown key components of an exemplary template-based rule-based network monitoring system according to an embodiment of the present invention.

The administrator as shown is an exemplary user of the system and may, for example, also be a network operator or the like. The administrator or user uses a graphical user interface (GUI) of a Rule Editor module to define desired/required monitoring rules. By way of this GUI, the administrator or user may act on pre-defined templates representing a basic rule pattern each. The templates for use may be delivered as a set of files, for example in XML (Extensible Markup Language) format or any other conceivable document description language. The provided templates, e.g. XML files, may be stored in a template library being linked with and thus being accessible by the Rule Editor according to the present embodiment. The Rule Editor thus implements, among others, a visualization of the rule patterns, i.e. templates, for usage in rule generation or modification, which includes dialogs for filing variables and options of the templates (see below for details). Furthermore, the Rule Editor according to the present embodiment contains a rule code generator for generating or modifying the respective desired/required rules from one template or plural combined templates (e.g. implementation specific data) and the information provided by the administrator or user (e.g. network or service specific data).

The generated rules may be directly deployed to a Rule Engine, or may be further modified. According to embodiments of the present invention, the modification may take place in two different equivalent views, that is the code view (also referred to as editor view) and the more abstract template view (also referred to as wizard view). Details concerning the views and their usage are given below with reference to FIGS. 4 and 5.

According to further embodiments of the present invention, besides the rule generation process as mentioned above, the same data required for generating the rule itself (i.e. templates and user information) may be used for generating test data and rule documentation. This could be done, for example, in parallel to the actual rule generation. On the one hand, the Rule Editor according to such embodiments generates test data denoted as tests in FIG. 1, which is supplied to a Test Tool simulating network events and verifying the rule response of a respective rule delivered by the Rule Engine without extra work. To this end, the templates according to respective embodiments of the present invention also contain information on required events and their expected responses in order to enable testing of the contained template logic by means of the above-mentioned Test Tool. On the other hand, principally independent of the test data generation, the Rule Editor according to such embodiments generates a rule documentation, which may be supplied to a documentation browser or database, and which may be used for network monitoring, exemplarily by means of a monitoring interface such as the Monitoring User Interface (UI) shown in FIG. 1, which may for example be used to display to the user monitoring results from applied rules.

The framework as described above may, for example, be implemented as a part of a service and/or network monitoring tool. The user interface and the code generator may for example be implemented as a Java program that generates rules in some kind of programming language. In this regard, it is to be noted that an implementation of the rule generation according to embodiments of the present invention is not limited to a specific programming language. Rather, any other language may be used, which allows the definition of procedures (e.g. alternatives like C, C++, Perl, Java, Pascal etc.). As a matter of course, this also applies to all of the aspects detailed below.

Before giving a more detailed description of the procedures according to embodiments of the present invention (i.e. rule generation, test data generation and/or documentation generation), an explanation of templates as used herein will be offered.

Figure 3:
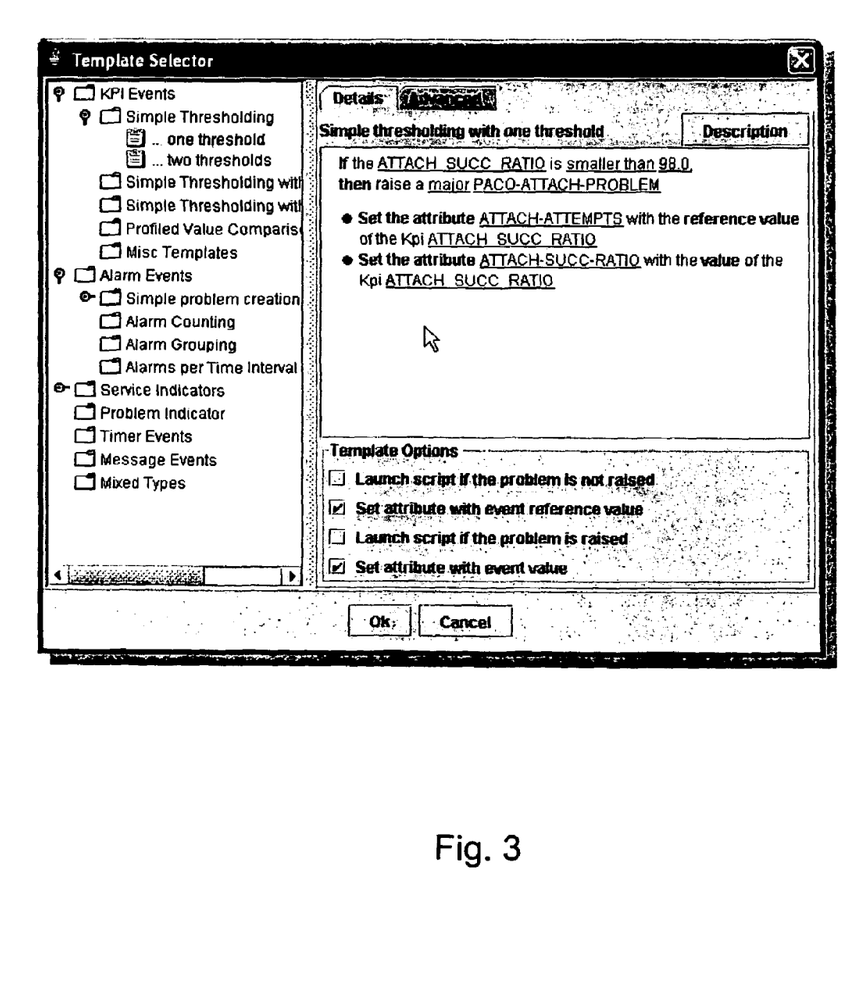
FIG. 3 shows an exemplary dialog for selecting and adjusting templates according to an exemplary embodiment of the present invention.

As mentioned above, a monitoring rule according to the present invention is basically constructed by means of a graphical user interface from one or more templates. A template provides a basic rule pattern including a number of variables and options to modify the logic thereof. Template variables hold, for example, network operator specific knowledge (e.g. names of alarms or network performance measurements, comparison operations, thresholds, repair script names, etc.) and need to be filled by the administrator before constructing a rule from a template. That is, placeholder variable names may be replaced by actual variables to be used during the rule generation process according to embodiments of the present invention. Template options allow switching optional template extensions on or off, which may or may not make sense in certain circumstances. That is, placeholder options may be activated or deactivated during the rule generation process according to embodiments of the present invention. For example, in a template with the pattern "If alarm XYZ is received then indicate this in monitoring tool and launch a repair script ABC", the variables are ABC and XYZ and the optional part (that can be switched on or off with a template option) is "and launch a repair script ABC". Another example of a template named "Simple thresholding with one threshold" is given in FIG. 3 illustrating a template selection module, on the right hand side of which a template with template options (represented by check boxes) and variables (represented by hyperlinks being underlined) is depicted by way of example.

According to present embodiments, a template may hold information on:
 source code parts (including variables and optional elements) that are used for building up monitoring rules,
 a textual presentation that explains the rule logic implemented by the source code and that is used for building up the rule documentation, help texts etc., and
 tests and test data that verifies the functionality of the source code if it is part of a rule.

According to present embodiments, the templates may be delivered in a user-extendable library. The delivery of templates in a library allows extending the templates (i.e. adding new templates) if new rule patterns are required. Thus, templates provide means to deliver network monitoring knowledge and may be a sellable (exchangeable) item.

In the following, there is described in more detail the construction (i.e. generation) of a rule (i.e. rule code) from one or more selected templates. It is to be noted that these procedures may be hidden by the (graphical) user interface, and thus are invisible to the administrator or user who (by default) only sees the rule as a list of selected templates and their contents.

Basically, according to present embodiments, a rule may be constructed from one or multiple (combined) templates. The code of a rule may have the following general (and language independent) parts:
 a definition part which declares variables and thresholds that are used within the rule code,
 a single event code part which contains rule actions that can be executed based on single events,
 an event correlating part which calculates conclusions that require information from multiple events, and
 a rule action part which executes the rule actions based on the resulting conclusions of the event correlating part.

The templates may contribute to each of the listed parts of the rule.

Figure 2:
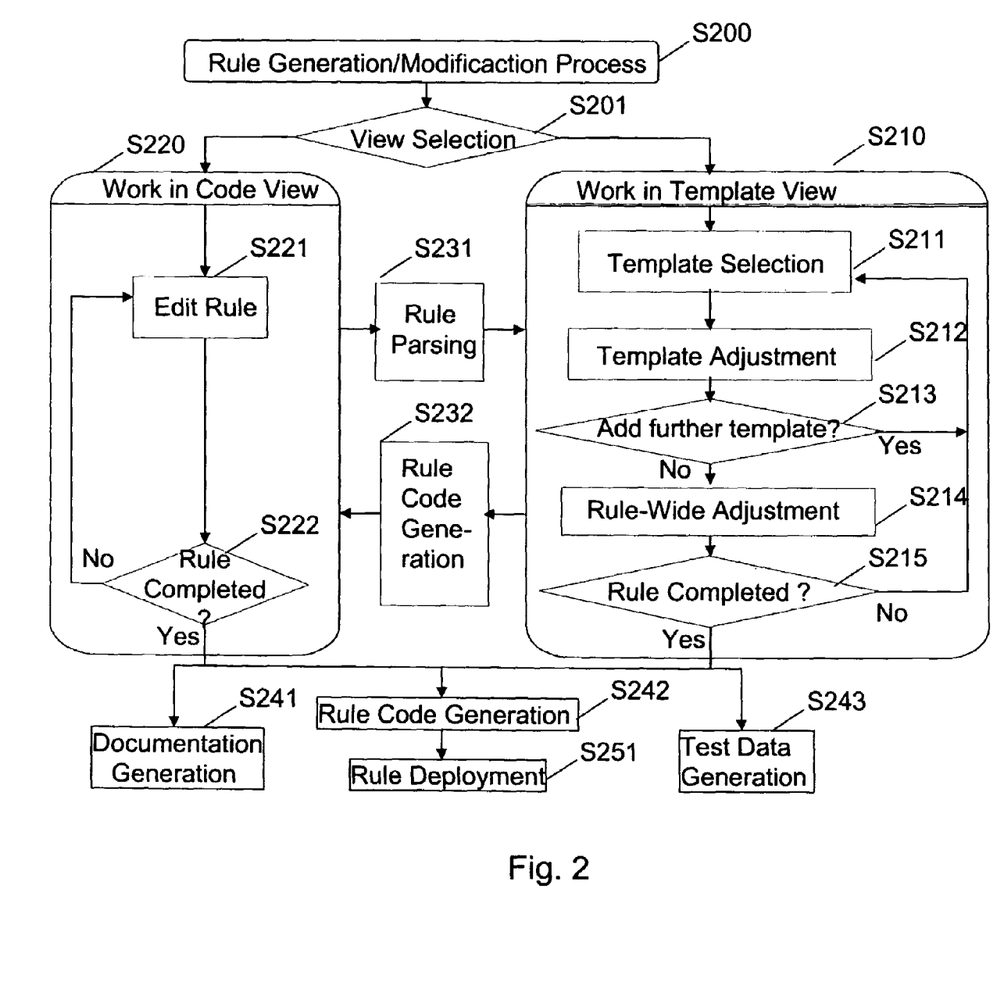
FIG. 2 illustrates a flow chart of a rule generation or modification method according to an exemplary embodiment of the present invention.

FIG. 2 illustrates a flow chart of a rule generation or modification method according to an embodiment of the present invention.

In accordance with the embodiment as illustrated in FIG. 2, for generating/modifying a monitoring rule in the rule generation process (S200), the user first of all performs a view selection in step S201. Thereby, it may be chosen between two different, but equivalent views according to the present embodiment, the template view (i.e. wizard view or standard user mode) and the code view (i.e. editor view or expert mode or script mode). While the template view presents the rule as a list/collection of templates with textual descriptions of the rule logic, thus offering an overview summarizing the rule logic (as exemplarily depicted in FIG. 4 and FIG. 5(*b*)), the code view shows the rule as (a piece of) code in its tool-specific programming language with all details of implementation (as exemplarily depicted in FIG. 5(*a*)). The proposed rule editor framework allows the user to switch back and forward between the views (as indicated by the blocks denoted as rule parsing and rule code generation in FIG. 2) depending on the requirements and/or skills and/or intentions of the user or rule developer in an unrestricted manner. The switching between the different views may, for example, be implemented by use of toggle-buttons, as depicted in the top right corner of the dialogs of FIG. 5. The template view is more a high-level view on the rule logic with relatively coarse possibilities to modify (e.g. by template variables and options, for example by way of hyperlinks and checkboxes, as indicated above). Using the code view requires knowing the tool-specific programming language, but rule modifications are less restricted as in the template view, thus enabling a manual extension of the (existing) rule in an arbitrary manner.

When working in the template view (step S210), either initially or at some other point in time, the user performs a selection of templates. Namely, having a certain rule logic in mind, the user chooses (i.e. fetches) one or more appropriate templates from the library of templates. In detail, in step S211, a first template is chosen, which may be adjusted (including configuration or parameters and/or choosing of certain options) to the actual purpose in step S212. According to present embodiments of the invention, the rule may be constructed not only from one single template, but may be constructed from a multitude of combined templates. To this end, in step S213, the user may choose to combine a further template, if desired (which might be considered to correspond to clicking the "ADD" button in FIG. 4). If the combination of a further template is chosen (YES in step S213), which may be done an arbitrary number of times, the process returns to steps S211 and S212 for selecting and adjusting the further template. If no further template is to be chosen, i.e. the entirety of templates needed for the rule are already selected (NO in step S213), the process advances to step S214.

During template selection and adjustment according to steps S211 to S213 of FIG. 2 (i.e. filling of template variables and options), the template logic is presented on the user interface by a textual description containing hyperlinked variables. The variables have a predefined type and clicking the hyperlink opens a dialog that limits input according to the variable type (e.g. numbers, texts, alarms, performance measurement names, comparison operations etc.). The user may click the hyperlinks in the textual description of the respective template, and may fill in the required data. The same also applies for the template options except that the options may be basically activated or deactivated instead of being filled with required data. While a template variable allows the user to provide input required for constructing a rule out of one or more templates, a template option provides the ability to extend or to modify the template logic. Therefore, activating a template option may in turn require filling additional template variables.

As an exemplary template selection module according to an embodiment of the present invention, FIG. 3 shows an exemplary dialog for selecting and adjusting templates according to an embodiment of the present invention.

In FIG. 3 it may be seen that, for the user, the template library (if having a tree-like storage structure) is for example presented as a tree where the folders structure the templates according to different criteria (e.g. the data type that is processed, similarities on the template logic etc.). In the example of FIG. 3, the folder "KPI Events" (KPI: Key Performance Indicator) contains the sub-folder "Simple Thresholding" which in turn contains the templates "Simple thresholding with one threshold" and "Simple thresholding with two thresholds." The further folders, such as "Alarm Events," may contain further sub-folders such as "Alarm Counting," and these may contain further templates, respectively. On the right hand side of FIG. 3, details of a selected template "Simple thresholding with one threshold" are illustrated, including the textual representation of its rule logic with the variables as hyperlinks in the upper part and its switchable options in the lower part. Accordingly, by way of the thus depicted exemplary template selection module, individual templates and their variables and options may be selected and adjusted. For example, when clicking one of the hyperlinks of template variables in the textual logic representation, specialized dialogs (not shown) may be opened, which allow modifying the respective variable's value. A template option allows extending or modifying the template by logic that may be useful in some use cases, but not all of them. For example, an option may activate an additional action if the condition of this option is true (e.g. launch a script etc.).

In general, a template definition contains source code for the above-listed rule parts, which is added to the rule, if the template is selected. For example, the definition part of a rule is constructed by sequentially adding the definition parts of all selected templates. Every template can contribute to one or more parts of the rule.

It is to be noted that templates may be incompatible with each other, for example if they contain contradicting logic or incompatible actions. According to an embodiment of the present invention, a template may thus not be added to a rule, if it is incompatible to a template that is already part of the rule. Hence, although not depicted, an embodiment of the present invention implements a compatibility check of a template to be added, which check may be regarded as part of the template selection process as described above, in particular the check may be part of the selection operation in step S211.

Referring again to FIG. 2, after finishing the selection of templates and their adjustment (NO in step S213 of FIG. 2), the process advances to step S214 in which a modifying operation may be carried out as rule-wide adjustment. Namely, in step S214, the so-called rule-wide adjustment allows to set any options that affect the entire rule (generated by then), as opposed to the modification of a single template within a rule according to step S212. This could be, for example, the way a rule is executed (e.g. as soon as an event arrives, or periodically once per time-interval).

In this regard, it is to be noted that template adjustments refer to setting variables or options of a template, while rule-wide adjustments refer to changing settings specific to the rule, i.e. concurrently relating to one or more templates of the rule. Rule-wide adjustments can thus not be assigned to an individual template.

Subsequently, it is decided whether or not the rule generation or modification is completed (step S215). That is, if it is determined that the rule is not yet completed, or is intended to be modified in terms of adding further templates (NO in step S215), it is possible to switch back to a template selection of step S211, even after the modification step S214.

If it is determined in step S215 that the rule is completed, the thus selected arrangement of templates is for example converted into source code (i.e. compiled—step S242) by way of the source code parts of the individual templates as selected and adjusted. Thereby, the rule is in principle generated, and may be ready for deployment to a rule engine (step S251). At the same time, test data generation (step S243) and rule documentation generation (step S241) may also be carried out, thus completing the rule generation process according to one embodiment of the present invention. It is to be noted that these steps S241, S242 and S243 are independent of each other, and may thus be carried out independently, either sequentially in any order or at any time point, in parallel, or only one or two of the processes instead of all three of them, or the like.

Figure 4:
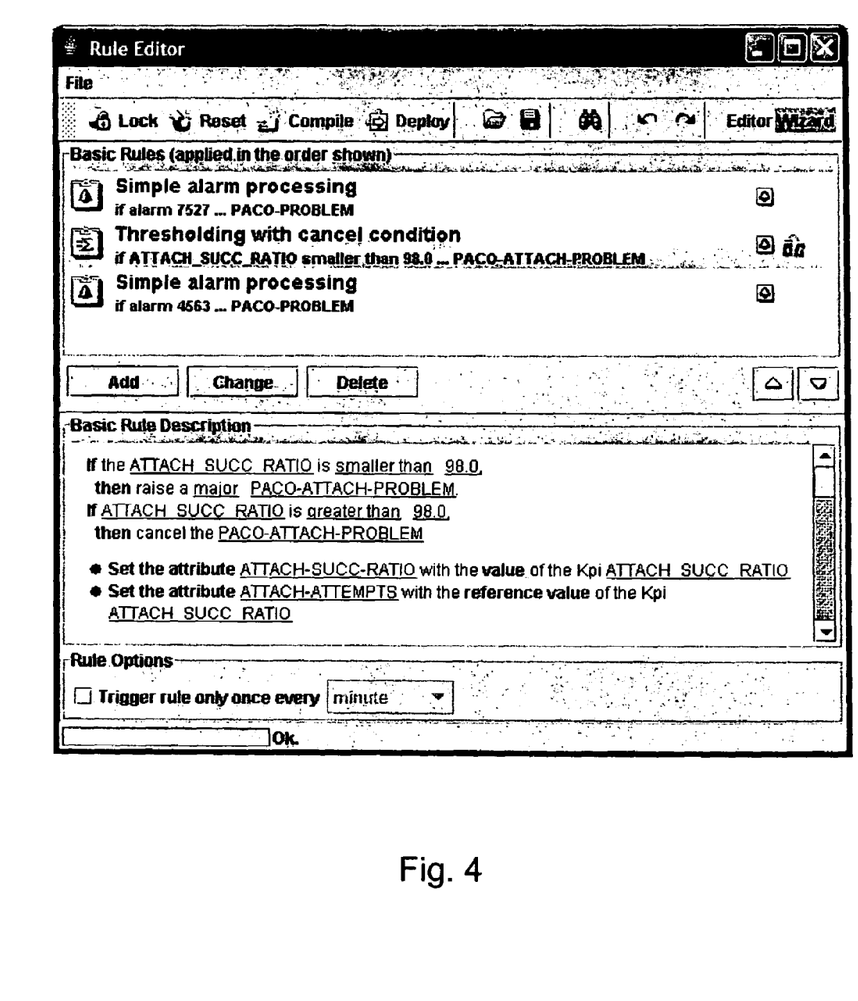
FIG. 4 shows an exemplary dialog for modifying a rule in a template view according to an exemplary embodiment of the present invention.

FIG. 4 shows an exemplary dialog, referred to as rule editor main window, for modifying a rule in a template view according to an embodiment of the present invention. It may be seen in FIG. 4 that, by way of the thus illustrated graphical user interface, an overview of the templates contributing to a rule is given. In the depicted case, three templates are combined to one rule, i.e. the "Simple alarm processing" template, the "Simple thresholding with cancel condition" template and the "simple alarm processing" template once again. Besides the list of templates, there are depicted icons in the line of each template, representing actions that the respective template executes, e.g. "raise problem", "set attribute" or "launch script". In the middle bar of the dialog, there are provided means for adding a new template or for modifying an already selected template, which opens the template selection dialog of FIG. 3. In the bottom part of the dialog, there is given a textual description of the highlighted template, here of the "Simple thresholding with cancel condition" template, wherein hyperlinks may be clicked to set variables and/or options.

Stated in other words, FIGS. 4 and 5(b) illustrate an example of a rule-wide adjustment option in the "Rule Options" box at the bottom of the dialog. The option controls the way how the rule is executed: either once in a time interval (when the option box is ticked, i.e. once per minute, per hour, etc.) or whenever an event is received (if the option box is not ticked). The template list in the "Basic Rules" box allows for selection of (designate) one or more templates to be modified concurrently. Depending on the selection, the "Basic Rule Description" box shows a textual description of all selected (designated) templates. The displayed description contains hyperlinks, that can be used (for convenience) to modify the variables directly without opening the template selection dialog (according to FIG. 3). So it is possible to modify the variables of multiple or even all (selected/designated) templates belonging to the same rule at the same time. It is also to be noted that the dialog in FIG. 4 is not enabled to change the template options, but only the variables thereof.

In more general terms, the following options for adjustment/modification exist according to one or more embodiments of the present invention:
  separately adjusting at least one of the selected rule templates by modifying variables and/or options thereof, wherein the adjusting is carried out in a template view on the basis of the rule template; and/or
  concurrently adjusting a plurality of rule templates by designating a plurality out of the selected rule templates of one rule, and modifying variables and/or options of the designated plurality of rule templates, wherein the adjusting is carried out in a template view on the basis of the rule templates; and/or
  adjusting a rule by editing rule code of the rule, wherein the adjusting is carried out in a code view on the basis of rule code; and/or
  optionally adjusting one or more rule wide options by selecting and configuring the rule wide options in the "Rule options" part in the template view (see FIG. 4).

According to the depicted embodiment of FIG. 2, there is also enabled a manual extension/modification of the rule in the above-mentioned code view of step S220, in particular in a rule editing step S221, if required. This may be done either initially, i.e. after view selection in step S201 (which is applicable mainly but not exclusively for the modification of a pre-existing rule) or at some other point in time, such as after rule generation in the template view.

For example, it is possible to modify the variables or options of a template (that is part of the rule) in the template view, then switch to the code view and add some manually typed code, then switch back to the template view and add another template, and finally create the complete rule that contains all templates plus the manually added code. In this way, the rule can be modified in the code view and template view in any order. Stated in other words, as each selected template is part of the rule to be generated, the rule as such may also be considered to be modified, if one of the templates is modified in step S205. It is further to be noted that, at least according to the present embodiment, only variables and options of a template may be modified, and that it may not be possible, for example, to modify the complete template logic as such.

A rule developer may use both views (at the same time or sequentially) in the same rule, thus modifying the rule in both views in parallel. The code view may be converted into the template view, for instance by means of a parser, referred to as rule parsing step 231 in FIG. 2, and the template view may be converted into the code view by means of a rule coder, for example, referred to as rule code generation step S232 in FIG. 2. Both conversions may be possible at any time during the rule generating/modifying/editing process, even when selecting and adjusting templates. To avoid interference between template-based code and manually created code in the same rule, both views are configured not to mutually modify the other's code. According to an embodiment of the present invention, this is achieved by structuring the whole rule code into dedicated sections that can only be modified in either one of the two views. In the code view, the parts generated in template view may, for example, appear as "guarded blocks", which can be viewed but not modified in the template view. The "template concept" is only visible in the template view, and therefore template options or variables cannot be modified in the code view according to the present embodiment, whereas this may be possible according to alternative embodiments.

Figure 5:
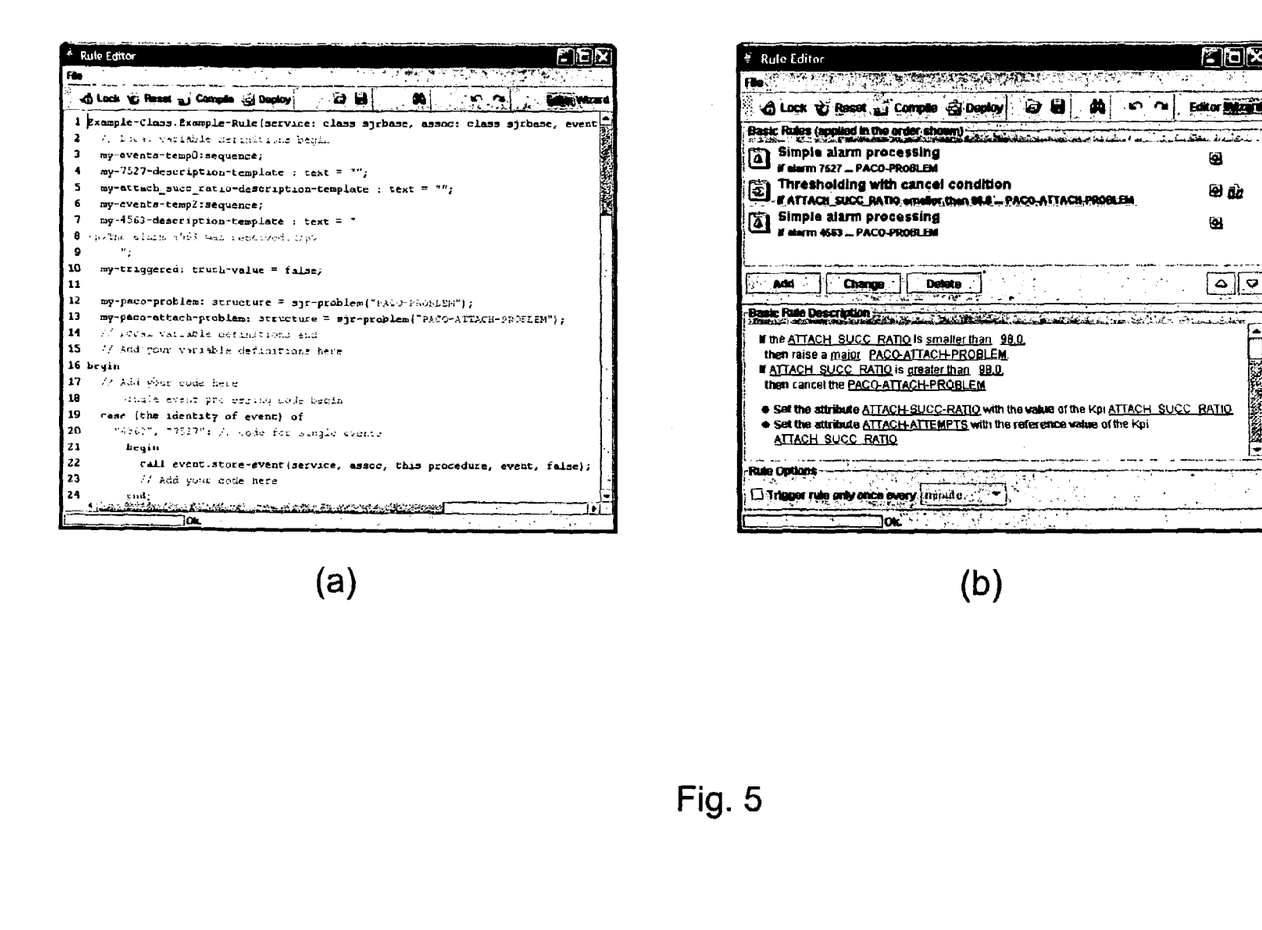
FIG. 5 shows exemplary dialogs for modifying the same rule in a code view (FIG. 5(a)) and a template view (FIG. 5(b)) according to exemplary embodiments of the present invention.

In the example of FIG. 5, which shows the same rule comprising three combined templates in both views side by side (wherein the left figure only shows a part of the code), such "guarded blocks" may appear in the code view with a highlighted (e.g. light grey) background.

Referring again to FIG. 2, similarly to the test of step S215, when the rule editing in step S220 or 221 is completed, thus the rule generation or modification as such being completed (YES in step S222), the rule code may be generated (step S242), and the generated rule (or rule code) may be deployed (step S251), for example, to a Rule Engine as depicted in FIG. 1. Additionally, according to one embodiment of the present invention, there may further be generated test data and a rule documentation in steps S241 and S243, as already mentioned above. In this regard, it is to be noted that these steps may be performed in parallel to the actual rule generation or modification, i.e. "in one go" when defining the rule, and are only depicted at the end of the process for the sake of clarity and lucidity.

On the other hand, in the test of step S222, it is also possible to switch back to rule editing in step S221, if it is determined that the rule is not yet completed, or even to switch to the template view, e.g. if it is intended to further modify the rule in terms of adding further templates (NO in step S222 and rule parsing S231 to arrive at step S211).

Although the above description of rule generation according to the present invention is mainly related to method steps and respective procedures, embodiments of the present invention also cover corresponding structural implementations such as apparatuses, systems and computer-readable media being adapted for carrying out the above method steps and procedures. For example, FIG. 1 illustrates a basic overview of a system arrangement according to an embodiment of the present invention.

Figure 6:
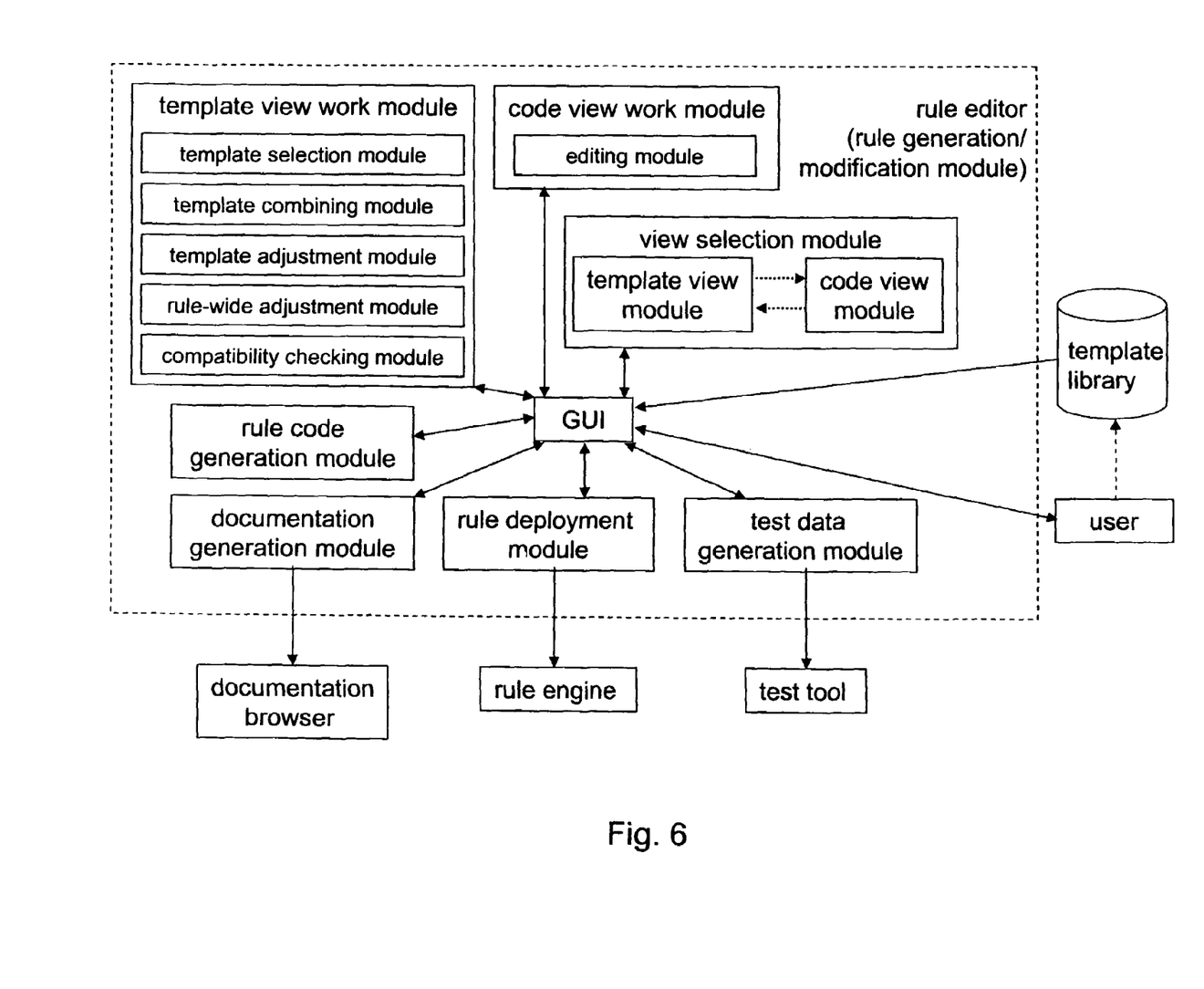
FIG. 6 schematically illustrates a system arrangement according to an exemplary embodiment of the present invention.

FIG. 6 illustrates a system arrangement according to an embodiment of the present invention in a schematic manner. In FIG. 6, there is also illustrated a rule editor, i.e. a template-based rule generation/modification module, according to an embodiment of the present invention.

According to the depicted embodiment of FIG. 6, a rule editor or rule generator (e.g. representing the Rule Editor of FIG. 1) comprises a graphical user interface GUI. The GUI module interconnects the user (e.g. a network operator or administrator), the template library, and the constituent modules of the rule editor, thus allowing respective interactions. According to the depicted embodiment of FIG. 6, the rule editor further comprises a view selection module, which is configured to carry out steps S201, S231 and S232 of FIG. 2. The view selection module is thus configured for displaying of and arbitrarily switching between the two views. To this end, although not explicitly shown (but indicated by dotted arrows between the respective blocks in FIG. 6), the view selection module may comprise, besides a template view module for template view displaying and a code view module for code view displaying, a rule parser module for converting the code view into the template view, and a rule coder module for converting the template view into the code view. The rule editor of FIG. 6 further comprises a template view work module for performing operations in template view (step S210 of FIG. 2), which is configured to carry out steps S211 to S215 of FIG. 2, cf. FIGS. 3, 4 and 5(*b*)). To this end, the template view work module may comprise one or more of a template selection module, a template combining module, a template adjustment module, a rule-wide adjustment module, and a compatibility checking module. The rule editor of FIG. 6 further comprises an code view work module for performing operations in code view (step S220 of FIG. 2), which is configured to carry out steps S221 and S222 of FIG. 2 (cf. FIG. 5(*a*)). To this end, the code view work module may comprise an editing module. Further, the rule editor of FIG. 6 comprises a rule code generation module being configured to carry out step S242 of FIG. 2, a rule deployment module being configured to carry out step S251 of FIG. 2, a documentation generation module being configured to carry out step S241 of FIG. 2, and a test data generation module being configured to carry out step S243 of FIG. 2. The rule deployment module may be connected with a rule engine such as the Rule Engine of FIG. 1, the test data generation module may be connected with a test tool such as the Test Tool of FIG. 1, and the documentation generation module may be connected with a documentation browser such as a rule documentation database or the like. In accordance with the above, it is to be noted that the test data generation module and the documentation generation module are optional modules, which may be omitted according to alternative embodiments of the present invention.

In detail, there are provided means (or a template selection module) for selecting at least two pre-defined rule templates, means (or a template combining module) for combining the selected rule templates into one rule, and means (or a rule code generation module) for generating a rule code of the rule. Furthermore, there may also be provided means (or a template adjustment module) for separately adjusting at least one of the selected rule templates by modifying variables and/or options thereof, wherein the adjusting is carried out in a template view on the basis of the rule templates, and/or means (or a rule-wide adjustment module) for concurrently adjusting a plurality of rule templates by designating a plurality out of the selected rule templates of one rule, and rule-wide modifying variables and/or options of the designated plurality of rule templates, wherein the adjusting is carried out in a template view on the basis of the rule templates, and/or means (or an editing module) for adjusting a rule by editing rule code of said rule, wherein the adjusting is carried out in a code view on the basis of rule code.

Also, there may be provided means (or a code view module) for displaying rule code in a code view and means (or a template view module) for displaying rule templates in a template view, and/or means (or a view selection module) for switching between the code view and the template view, and/or means (or a compatibility checking module) for checking compatibility for added or modified rule templates so as to ensure compatibility with the other selected rule templates, and/or means (or a rule deployment module) for deploying the generated rule code to a rule engine, and/or means (or a test data generation module) for generating test data for the generated rule code wherein the same data as for rule code generation are utilized to this end, and/or means (or a documentation generation module) for generating a rule documentation for the generated rule code, wherein the same data as for rule code generation are utilized to this end, and/or means (or a graphical user interface) for providing a graphical user interface for user interaction with a rule editor.

According to a first option, the above device (or module) may be configured for a template-based rule code generation in a rule-based monitoring system, wherein the selecting means (or template selection module) is further configured for fetching the rule templates from a template library, in which the rule templates are organized in a tree structure.

According to a second option, the above device (or module) may be configured for a template-based rule code modification in a rule-based monitoring system, wherein the selecting means (or template selection module) is further configured for fetching at least one rule template from a pre-existing rule, and/or wherein the selecting means (or template selection module) is further configured for fetching at least one rule templates from a template library, in which the rule templates are organized in a tree structure, and further comprising wherein the template combining module is further configured to add the at least one rule template from the template library to a pre-existing rule, and/or wherein the template combining module is further configured to remove a template from a pre-existing rule, and/or wherein the template adjustment module is further configured to adjust at least one of the selected rule templates (either from a pre-existing rule or fetched from the rule library) by modifying variables and/or options thereof.

Further, the rule editor according to an embodiment of the present invention could be further adapted for a modification of a pre-existing rule. To this end, although not depicted in FIG. 6, a rule editor according to such an embodiment may further comprise at least one of a template addition module for adding at least one template (from the template library) to the pre-existing rule, a template removal module for removing a template from the pre-existing rule, and a template modification module for adjusting at least one of selected templates (either from a pre-existing rule or fetched from the rule library) by modifying variables and/or options thereof. Such a module or such modules may be arranged both in the template view work module and the code view work module. According to an alternative embodiment, the respective functions of a template addition module and the template removal module may also be implemented by the above-mentioned template combining module, and the function of the template modification module may also be implemented by the above-mentioned template adjustment module.

Furthermore, as is indicated by a broken arrow between the user and the template library in FIG. 6, the user may extend/modify the library, or the templates stored therein, i.e. the user may add, remove or modify templates to/from the library, and may reorganize the templates in the library e.g. in a tree structure It is to be noted that any one of the modules and units depicted in FIG. 1 may be implemented both in hardware (as distinct apparatuses/devices or as integrated units, if appropriate) or in software by means of any conceivable programming language, in particular by virtue of computer-readable media storing respective computer program instructions. Hence, the above description and figures relate equivalently to methods, devices, modules, computer programs, or any other conceivable way of implementing the described features.

According to the present invention, embodiments thereof and/or individual aspects thereof, there may be provided at least a part of the following features in any feasible combination as derivable from the present specification.

Namely, a graphical creation of rules for various monitoring purposes may be provided, wherein a rule may consist of a definition part, a single event code part, an event correlation part, and a rule action part. A rule generation may be based on templates, wherein many templates may be combined in a single rule, templates may be defined in advance, templates may be stored in a library. Such a library may be extended/modified by a user, i.e. templates may be added or removed from the library, and the templates in the library may be organized in a tree structure. After rule generation by way of the graphical user interaction, graphically described rules may be converted into source code which may be manually extended. To this end, there may be provided two views, i.e. a code view and a template view (high level view). Data input via the GUI (together with template data) may be used to generate the rule, to generate test data for testing the rule, and/or to generate a rule documentation.

In particular, by combining plural templates for generation of a single rule, quite complex rules may be constructed in a simple manner. By use of rather simple (non-complex) templates, each having a rather limited number of variables and options, the individual templates are easy to display in a single dialog, and thus easy to handle by a user. Due to the possibility for combining a multitude of such simple templates within one rule, an arrangement of multiple templates may represent a powerful tool for various purposes.

By coupling of rule (code) generation and test data as well as documentation generation, there is provided a single point that holds the rule logic from which development items may be automatically derived. That is, there is no need to manually change rule implementation, rule testing and/or rule documentation, when the rule logic is to be changed. Accordingly, consistency between rule logic and these three development items is ensured.

Furthermore, by way of the framework and implementation as proposed, every template within a rule, which requires a specific event (or multiple events), will receive this event (these events), thus being enabled to do its processing. Thus, the execution order of the templates within a rule or the execution order of rules does not affect the overall processing. That is, there is not applied a first-rule-wins strategy, which may hinder the execution of "later" rules.

By virtue of the present invention, embodiments thereof and/or individual aspects thereof, as described herein, the following effects may be achieved.

The generation of complex monitoring rules via an easy to use graphical user interface is enabled without requiring deep programming skills. Also, effort and time used for implementing a tested rule may be reduced drastically (i.e. from days to minutes), in that test data generation and rule documentation may be optimized.

There may be provided an intuitive and fast way of creating monitoring rules of any complexity with out knowing a tool-specific programming language. The template-based approach to look at monitoring rules presents the rule logic in a very clear way without (potentially distracting) details of the implementation.

The effects of the thus presented approach may be distinguished from the point of view of different groups of users, i.e. network administrators who set up a monitoring tool to monitor a specific network (feature), network operator organizations which run an IP or communication network, and monitoring tool vendors which provide a tool to monitor such networks.

From the point of view of the network administrators, it is particularly interesting that it is possible to generate rule code without knowledge on the monitoring tool specific programming language. Also, generation of monitoring rules becomes much faster and the rules are more reliable because the templates have been centrally tested with all kind of variables and options settings. The template view on the rule allows focusing on the rule logic without (potentially distracting) details of the rule implementation. Application of templates provides a more abstract overview of the rule that allows understanding of the rule logic much better than if reading the code of the rule. The clearer presentation of basic rules (by means of the template view) increases understandability and therefore trust and acceptability of the system. A smooth integration of documentation and test generation into the development process is provided. Hence, generation of test data and rule documentation is part of the implementation (not an extra step), and the generated items are always in synchronization with the actual rule implementation. Templates are implemented by experienced rule developers and provide a means to learn about typical rule patterns for monitoring a network problem.

From point of view of network operators it is particularly interesting that operational expenditures (OPEX) are reduced in several ways:

cost reduction because of faster and more reliable rule creation, cost reduction because the template-based rule-code generation is less demanding to employees (i.e. employee needs no programming skills). This reduces the costs for external integration teams in favor to cheaper internal implementations, and the improved and clearer rule documentation reduces the time to introduce somebody to the monitoring system.

From the point of view of monitoring tool vendors, it is particularly interesting that monitoring templates (due to the modularity thereof, each of which being defined within one file) are a sellable item and therefore a potential source of additional revenue. This includes general and customer-specific templates. Besides selling the templates themselves, there is also the possibility to sell consultancy that develops operator specific rules by means of templates. With the thus presented framework, a consultant can directly implement operator specific rules at the operator since developing rules becomes easier, faster, and more reliable. Templates store the network specific information in template variables and template options. Compared to monitoring rules, they can be delivered to a much wider range of network operators because they are less network or technology specific. This allows central development of templates and wizard-driven customization to network operator specific features. Templates hide the implementation of a monitoring rule. Porting of customer developed rules from one monitoring release to another can be simplified by porting the templates that have been used to create the rule plus a simple rebuild of the rule with the new template. A trade-off between complexity of templates and their applicability to a large number of use cases may be achieved by adapting the number of variables and options and their possible values per template according to the respective purpose.

In general, the template library as proposed provides a structured means to store network monitoring know-how in easy to use templates. Templates contain (and hide) the knowledge how the monitoring tool implements a specific monitoring rule.

Any methods and operations described above may of course be implemented by way of software and/or hardware.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as, for example, Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc., using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Generally, for the purpose of the present invention as described herein above, it should be noted that:

networks referred to in this connection may comprise mobile and fixed network sections independent of the type of technology on which the networks are operated, for example those networks operate on the basis of the Internet Protocol IP, independent of the protocol version (IPv4 or IPv6), or on the basis of any other packet protocol such as User Datagram Protocol UDP, etc.

devices can be implemented as individual devices, devices may also be implemented as a module configured to accomplish interoperability with other modules constituting an entire apparatus, e.g. a module device may be represented as a chipset or chip card which may be insertable and/or connectable to an apparatus such as a mobile phone, or a module may be realized by executable code stored to a mobile phone or other device for execution upon invocation.

Furthermore, the present invention generally also covers respective computer programs as well as circuit arrangements for carrying out the aspects of the method/s and/or for operating hardware to carry out the aspects of the above method/s.

In summary, there is proposed a rule-based monitoring framework that offers a simplified GUI-driven and template-based way to specify and generate monitoring rules. The automatically generated rules can be directly deployed or further modified, in particular by combining plural templates. The modification can take place in two different views on the rule: the code view (also referred to as editor view), and in the more abstract template view (also referred to as wizard view). The views can be changed at any time during the modification/generation process. Further on, there is proposed to automatically generate, from the GUI-driven input data, test data and rule documentation. This could be done preferably in parallel with rule generation. The present invention and its embodiments enable the generation of complex monitoring rules via the GUI without requiring deep programming skills. Further on, effort and time used for test data generation and rule documentation is optimized.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
    receiving a selection of at least two pre-defined rule templates at a graphical user interface coupled to a computer network, the graphical user interface comprising a display device coupled to a user input device;
    displaying at the graphical user interface a combination of the at least two predefined rule templates merged into one rule;
    generating a rule code for the one rule;
    wherein the graphical user interface is configured to display the rule code in a code view, to display the rule templates in a template view, and to switch between the code view and the template view;
    concurrently adjusting a plurality of rule templates by designating a plurality of the selected rule templates of one rule; and
    modifying variables or options of the designated plurality of rule templates, wherein the adjusting is carried out in the template view based on the rule templates.

2. The method of claim 1, wherein a rule template comprises a source code part, a textual presentation of a logic, tests, and test data.

3. The method of claim 1, comprising:
    using the graphical user interface for separately adjusting at least one of the selected rule templates by modifying variables or options of the selected rule templates,
    wherein the adjusting is carried out in the template view based on the rule templates.

4. The method of claim 1, comprising:
    adjusting at least one rule-wide option by selecting at least one rule-wide option and modifying parameters of the designated rule-wide option.

5. The method of claim 1, comprising:
    adjusting a rule by editing rule code of said rule,
    wherein the adjusting is carried out in the code view based on the rule code.

6. The method of claim 1, wherein the generating the rule code comprises converting the rule of the combined rule templates into a source code.

7. The method of claim 1, wherein parts of the rule being modified in one of the code view and template view is viewable, but not modifiable in the other view.

8. The method of claim 1, further comprising:
checking compatibility of added or modified rule templates with the other selected rule templates.

9. The method of claim 1, further comprising:
generating test data for the generated rule code,
wherein the same data as for rule code generation is utilized for the generation of test data.

10. The method of claim 1, further comprising:
generating a rule documentation for the generated rule code,
wherein the same data as for rule code generation is utilized for the generation of the rule documentation.

11. The method of claim 1, wherein said generating comprises generating a template-based rule code in a rule-based monitoring system.

12. The method of claim 1, wherein the selecting at least two pre-defined rule templates comprises fetching the rule template from a template library, in which the rule templates are organized in a tree structure.

13. The method according to claim 1, wherein said generating comprises further modifying a template-based rule code in a rule-based monitoring system.

14. The method of claim 13, further comprising at least one of
fetching at least one rule templates from a template library, in which the rule templates are organized in a tree structure, and adding the at least one rule template from the template library to a pre-existing rule;
removing at least one rule template from a pre-existing rule; and
adjusting at least one of the selected rule templates by modifying variables or options of the selected rule templates.

15. A device comprising:
a template selection module comprising a graphical user interface configured to select at least two pre-defined rule templates, the graphical user interface comprising a display device coupled to a user input device;
a template combining module coupled to the graphical user interface and configured to combine the selected rule templates into one rule;
a rule code generation module configured to generate a rule code for the one rule;
wherein the graphical user interface further comprises a code view module configured to display the rule code in a code view, and a template view module configured to display rule templates in a template view;
a template adjustment module configured to concurrently adjust a plurality of rule templates by designating a plurality of the selected rule templates of one rule, and to modify variables or options of the designated plurality of rule templates, wherein the adjusting is carried out in the template view based on the rule templates.

16. The device of claim 15, wherein a rule template comprises a source code part, a textual presentation of a logic, tests, and test data.

17. The device of claim 15, comprising:
a template adjustment module configured to separately adjust at least one of the selected rule templates by modifying variables or options of the selected rule templates,
wherein the adjusting is carried out in the template view based on the rule templates.

18. The device of claim 15, comprising:
a rule-wide adjustment module configured to adjust at least one rule-wide option by selecting at least one rule-wide option and modifying variables or parameters of the designated rule-wide options.

19. The device of claim 15, comprising:
an editing module configured to adjust a rule by editing rule code of said rule,
wherein the adjusting is carried out in the code view based on the rule code.

20. The device of claim 15, wherein the rule code generation module is further configured to convert the rule of the combined rule templates into a source code.

21. The device of claim 15, further comprising:
a view selection module configured to switch between the code view and the template view.

22. The device of claim 15, wherein parts of the rule being modified in one of the code view and template view is viewable, but not modifiable in the other view.

23. The device of claim 15, further comprising:
a compatibility checking module configured to check compatibility of added or modified rule templates with the other selected rule templates.

24. The device of claim 15, further comprising:
a test data generation module configured to generate test data for the generated rule code,
wherein the same data as for rule code generation is utilized for the generation of the test data.

25. The device of claim 15, further comprising:
a documentation generation module configured to generate a rule documentation for the generated rule code,
wherein the same data as for rule code generation is utilized for the generation of the rule documentation.

26. The device of claim 15, wherein the device is configured for a template-based rule code generation in a rule-based monitoring system.

27. The device of claim 15, wherein the device is part of a network operation support system.

28. The device of claim 15, wherein the template selection module is further configured to fetch the rule templates from a template library, wherein the rule templates are organized in a tree structure in the template library.

29. The device of claim 15, wherein the device is configured for a template-based rule code modification in a rule-based monitoring system.

30. The device of claim 29, wherein the device is configured in accordance with at least one of the following:
the template selection module is further configured to fetch at least one rule template from a template library, in which the rule templates are organized in a tree structure, and the template combining module is further configured to add the at least one rule template from the template library to a pre-existing rule;
the template combining module is further configured to remove at least one rule template from a pre-existing rule; and
the template adjustment module is further configured to adjust at least one of the selected rule templates by modifying variables or options of the selected rule templates.

31. A computer program, embodied on a computer-readable medium, said computer program configured to control a processor to:

receive a selection of select at least two pre-defined rule templates from a graphical user interface comprising a display device coupled to a user input device;
combine the selected rule templates into one rule;
generate a rule code of said rule;
wherein the graphical user interface is configured to display the rule code in a code view, display the rule templates in a template view, and switch between the code view and the template view;
concurrently adjust a plurality of rule templates by designating a plurality of the selected rule templates of one rule; and
modify variables or options of the designated plurality of rule templates, wherein the adjusting is carried out in the template view based on the rule templates.

32. A device comprising:
selecting means for selecting at least two pre-defined rule templates;
combining means for combining the selected rule templates into one rule;
generating means for generating a rule code of said rule;
wherein the selecting means comprises a display device, a user input device, a code view module configured to display the rule code in a code view on the display device, and a template view module configured to display rule templates in a template view on the display device;
adjusting means for concurrently adjusting a plurality of rule templates by designating a plurality of the selected rule templates of one rule; and
modifying means for modifying variables or options of the designated plurality of rule templates, wherein the adjusting is carried out in the template view based on the rule templates.

* * * * *